United States Patent
Lee (10) Patent No.: US 9,996,282 B2
(45) Date of Patent: Jun. 12, 2018

(54) METHOD OF OPERATING DATA STORAGE DEVICE AND METHOD OF OPERATING SYSTEM INCLUDING THE SAME

(71) Applicant: SAMSUNG ELECTRONICS CO., LTD., Suwon-si, Gyeonggi-Do (KR)

(72) Inventor: Taek Kyun Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 80 days.

(21) Appl. No.: 15/194,703

(22) Filed: Jun. 28, 2016

(65) Prior Publication Data

US 2017/0031615 A1   Feb. 2, 2017

(30) Foreign Application Priority Data

Jul. 27, 2015   (KR) .................. 10-2015-0105584

(51) Int. Cl.
  *G06F 3/06*   (2006.01)
(52) U.S. Cl.
  CPC ............ *G06F 3/0619* (2013.01); *G06F 3/064* (2013.01); *G06F 3/0659* (2013.01); *G06F 3/0679* (2013.01)
(58) Field of Classification Search
  CPC .. G11C 16/3418; G11C 16/0483; G11C 16/10
  See application file for complete search history.

(56) References Cited

U.S. PATENT DOCUMENTS

| 8,527,730 | B2 | 9/2013 | Fujimoto |
| 8,631,191 | B2 | 1/2014 | Hashimoto |
| 8,730,348 | B2 | 5/2014 | Hamada |
| 8,782,389 | B2 | 7/2014 | Dolgunov et al. |
| 8,982,620 | B2 | 3/2015 | Lee et al. |
| 2001/0012222 | A1* | 8/2001 | Terasaki ............... G06F 12/0246 365/200 |
| 2002/0041517 | A1* | 4/2002 | Kim ..................... G06F 12/0246 365/185.11 |
| 2002/0099904 | A1* | 7/2002 | Conley ............... G06F 12/0246 711/103 |
| 2003/0065876 | A1* | 4/2003 | Lasser ................. G06F 12/0246 711/103 |
| 2003/0163629 | A1* | 8/2003 | Conley .................. G11C 16/10 711/103 |
| 2004/0208059 | A1* | 10/2004 | Lee .......................... G11C 8/08 365/185.11 |

(Continued)

FOREIGN PATENT DOCUMENTS

| JP | 2004310650 | 4/2003 |
| JP | 2011203771 | 3/2010 |

(Continued)

*Primary Examiner* — Midys Rojas
*Assistant Examiner* — Khoa D Doan
(74) *Attorney, Agent, or Firm* — Volentine, Whitt & Francos, PLLC (57) ABSTRACT

A method of operating a data storage device including a non-volatile memory device includes receiving an update command from a host; and closing a first log block, which is included in the non-volatile memory device and which includes an open word line, in response to the update command. The closing is performed to avoid update data, which is transmitted from the host and related to the update command, being subsequently written to an empty page of the first log block.

15 Claims, 9 Drawing Sheets

(56) References Cited

U.S. PATENT DOCUMENTS

| | | | |
|---|---|---|---|
| 2005/0144362 A1* | 6/2005 | Lin | G11C 16/0416 711/103 |
| 2007/0113029 A1* | 5/2007 | Bennett | G06F 12/0246 711/159 |
| 2009/0310408 A1* | 12/2009 | Lee | G11C 11/5628 365/185.03 |
| 2009/0327585 A1* | 12/2009 | Yeh | G06F 12/0246 711/103 |
| 2010/0321999 A1* | 12/2010 | Yoo | G11C 11/5628 365/185.03 |
| 2011/0055513 A1* | 3/2011 | Lee | G06F 9/4411 711/173 |
| 2011/0205817 A1* | 8/2011 | Yoon | G11C 11/5628 365/189.16 |
| 2012/0072680 A1* | 3/2012 | Kimura | G06F 11/108 711/154 |
| 2013/0067138 A1* | 3/2013 | Schuette | G06F 3/0616 711/103 |
| 2014/0164687 A1* | 6/2014 | Kwon | G06F 12/0246 711/103 |
| 2014/0208007 A1 | 7/2014 | Cohen et al. | |
| 2014/0237286 A1* | 8/2014 | Jung | G11C 29/76 714/6.13 |
| 2014/0281281 A1 | 9/2014 | Zhang et al. | |
| 2015/0055411 A1* | 2/2015 | Kim | G11C 11/5628 365/185.02 |
| 2015/0127887 A1* | 5/2015 | Kim | G11C 5/143 711/103 |
| 2015/0332770 A1* | 11/2015 | Kim | G11C 16/0483 365/185.12 |
| 2016/0163393 A1* | 6/2016 | Liang | G11C 16/349 365/185.12 |
| 2016/0343449 A1* | 11/2016 | Lee | G11C 11/5635 |

FOREIGN PATENT DOCUMENTS

| | | |
|---|---|---|
| JP | 5395163 B2 | 1/2014 |
| KR | 20140080948 A | 7/2014 |

* cited by examiner

FIG. 9

METHOD OF OPERATING DATA STORAGE DEVICE AND METHOD OF OPERATING SYSTEM INCLUDING THE SAME

CROSS-REFERENCE TO RELATED APPLICATION

A claim of priority under 35 U.S.C. § 119(a) is made to Korean Patent Application No. 10-2015-0105584 filed on Jul. 27, 2015, the entire contents of which are hereby incorporated by reference.

BACKGROUND

The present inventive concept herein relates to a data storage device, and more particularly, to a data storage device capable of closing a log block including an open word line subjected to subsequent writing based on information sent from a host, and a data processing system including the same.

When an operating system (OS) for a system using a flash memory-based data storage device is Android™, Linux™, Tizen™, or Windows®; an area, such as a boot partition or a system partition, which is normally used as a read-only area may exist within the data storage device. The host may write new data to the read-only area in order to update the system.

When a block included in the read-only area includes a memory region to which data has been programmed and an empty memory region, and the data is read from the memory region many times, read disturbance occurs in memory cells included in the empty memory region adjacent to the programmed memory region. When new data is subsequently written to the empty memory region where the read disturbance occurred during a program operation, the distribution of memory cells included in the empty memory region changes. During a read operation of the data programmed to the empty memory region, uncorrectable error correction code (ECC) errors may occur in the data.

SUMMARY

Some embodiments of the inventive concept provide a data storage device capable of closing a log block including an open word line based on information sent from a host to avoid uncorrectable error correction code (ECC) errors that may occur due to read disturbance, and a data processing system including the same.

According to some embodiments of the inventive concept, there is provided a method of operating a data storage device including a non-volatile memory device. The method includes receiving an update command from a host; and closing a first log block, which is included in the non-volatile memory device and which includes an open word line, in response to the update command The method may further include assigning an empty block included in the non-volatile memory device for a second log block in response to the update command. The method may further include changing a first page offset corresponding to a first empty page of the first log block into a second page offset corresponding to a first empty page of a second log block. The method may further include receiving update data related to the update command from the host and writing the update data to the second log block.

The first log block and the second log block may be included in a read-only region from a viewpoint of the host or included in a cold data region that stores cold data.

The closing may be performed to avoid update data, which is transmitted from the host and related to the update command, being subsequently written to an empty page of the first log block. The closing may include writing dummy data to all empty pages included in the first log block in response to the update command to change the first log block into a data block. According to some embodiments of the inventive concept, the closing may include changing a page offset related to an empty page included in the first log block. The non-volatile memory device may be distinguished from other non-volatile memory devices by a channel and a way.

According to some embodiments of the inventive concept, the closing may include changing a first page offset for a first page to which update data related to the update command will be written into a second page offset pointing to a second page that does not have read disturbance. The first page may be a first empty page of the first log block and the second page may be another empty page of the first log block or of a second log block other than the first log block.

According to other embodiments of the inventive concept, there is provided a method of operating a system which includes a host and a data storage device. The method includes the host sending an update command to the data storage device; and the data storage device closing a first log block, which is included in a non-volatile memory device included in the data storage device and which includes an open word line, in response to the update command.

The method may further include the data storage device changing a first page offset corresponding to a first empty page of the first log block into a second page offset corresponding to a first empty page of a second log block, receiving update data related to the update command from the host, and writing the update data to the second log block using the second page offset.

The first log block and the second log block may be included in a read-only region from a viewpoint of the host or included in a cold data region that stores cold data.

The closing may be performed to avoid update data, which is transmitted from the host and related to the update command, being subsequently written to an empty page of the first log block. The closing may include writing dummy data to all empty pages included in the first log block in response to the update command to change the first log block into a data block.

According to some embodiments of the inventive concept, the closing may include changing a first page offset for a first page to which update data related to the update command will be written into a second page offset pointing to a second page that does not have read disturbance.

According to further embodiments of the inventive concept, there is provided a method of operating a data storage device which includes a non-volatile memory device including a first log block including an open word line and a second log block. The method includes receiving an update command from a host and changing a first page offset for a first page to which update data related to the update command will be written into a second page offset pointing to a second page that does not have read disturbance in response to the update command. The changing may be performed to avoid update data transmitted from the host being subsequently written to an empty page of the first log block.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF THE EMBODIMENTS

The inventive concept will be described more fully hereinafter with reference to the accompanying drawings, in which embodiments of the inventive concept are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It should be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It should be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the inventive concepts belong. It should be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

A flash memory device may include a two-dimensional (2D) memory cell array or three-dimensional (3D) memory cell array. The 2D or 3D memory cell array may include a plurality of blocks, each of which may include a plurality of pages. Each of the pages may include a plurality of memory cells. A single page may be defined by a plurality of memory cells connected to at least one word line.

The memory cell array may include a 3D memory cell array. The 3D memory cell array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the present inventive concept, the 3D memory cell array includes vertical NAND strings that are vertically oriented such that at least one memory cell is located over another memory cell. The at least one memory cell may comprise a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Each of the memory cells may be a single level cell (SLC) that stores information of one bit or a multi-level cell (MLC) that stores information of at least two bits. The information may refer to logic 1 or logic 0. One-bit information may also be stored in an MLC. Data programmed to a page may be referred to as page data. When an MLC stores information of two bits, one of the two bits is a least significant bit (LSB) and the other is a most significant bit (MSB).

A write (or program) operation or a read operation is normally performed on each page and an erase operation is normally performed on each block in a flash memory device.

Hereinafter, a data block may refer to a block full of data and an empty block may literally refer to a block which is empty. A log block may refer to a block which is neither a data block nor an empty block. An empty block may be a log block.

A page in which data is stored in a log block may be referred to as a closed word line. A page (i.e., an empty page or a free page) in which no data is stored in a log block may be referred to as an open word line. Accordingly, part of a log block may include programmed pages defined as closed word lines and the remaining part of the log block may include empty pages defined as open word lines.

Closing a log block including an open word line means preventing new data (e.g., new system update data) from being written (or programmed) to a first empty page among empty page(s) included in the log block. The writing may refer to subsequent writing. In some embodiments of the inventive concept, a data storage device may write new data transmitted from a host to an empty block instead of writing the new data to a log block including an empty page.

According to some embodiments of the inventive concept, in order to close a log block including an open word line a data storage device may change a page offset of a first empty page included in the log block into an offset of a first empty page included in an empty block. In some embodiments, in order to close a log block including an open word line, a data storage device may write dummy data to all empty pages include in the log block. When the dummy data is written to the empty pages, a page offset indicating an empty page in the log block may be automatically changed into a page offset of a first empty page in an empty block. The page offset may be a page pointer pointing to an empty page.

Figure 1:
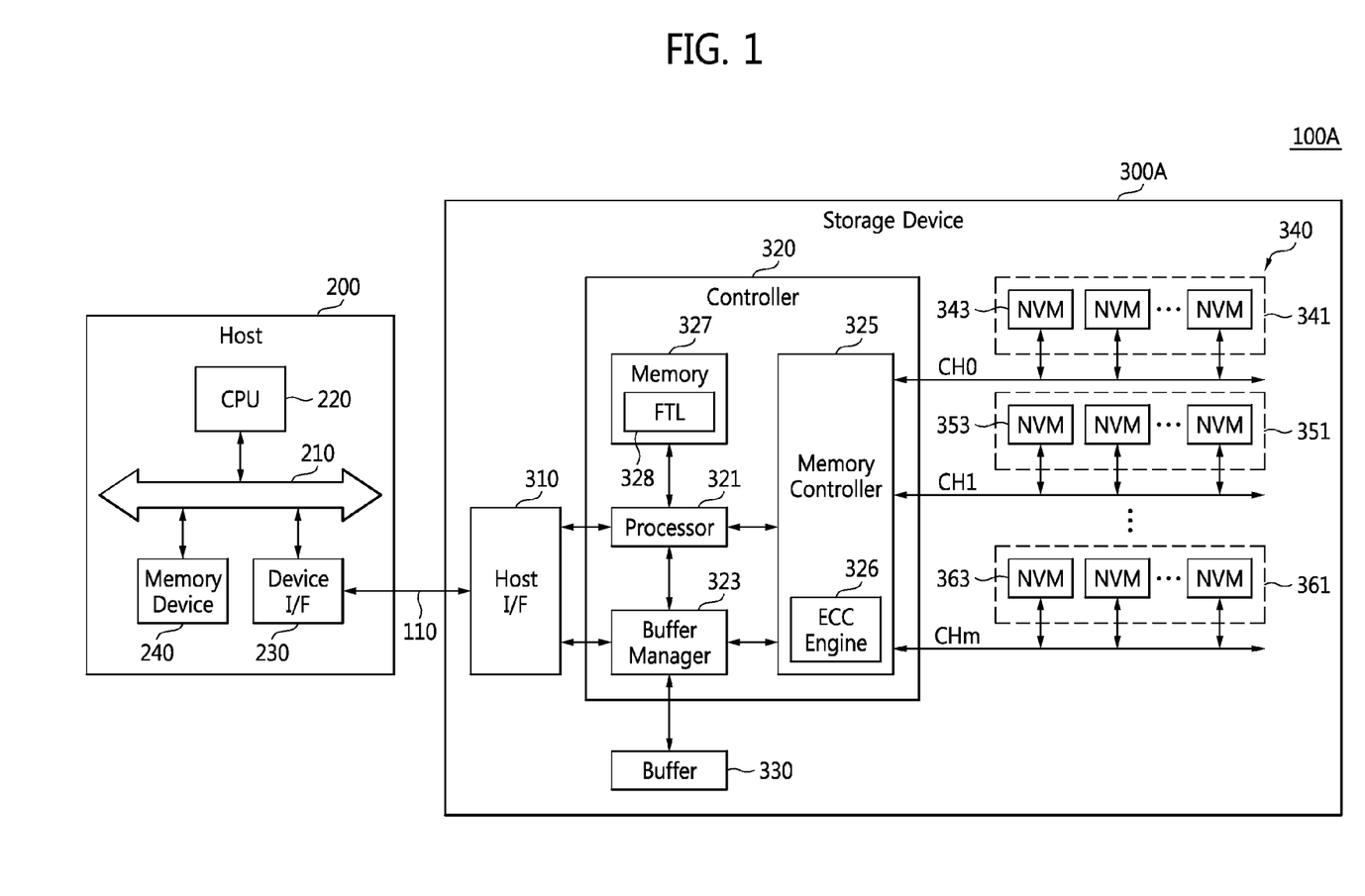
FIG. 1 is a block diagram of a data processing system according to some embodiments of the inventive concept.

FIG. 1 is a block diagram of a data processing system 100A according to some embodiments of the inventive concept. Referring to FIG. 1, the data processing system 100A may include a host 200 and a data storage device 300A which can communicate a command and/or data with the host 200 via an interface 110. According to some embodiments, the data processing system 100A may be implemented as a personal computer (PC), a workstation, a data center, an internet data center (IDC), a direct attached storage (DAS), a storage area network (SAN), a network attached storage (NAS), or a mobile computing device, but the inventive concept is not restricted to the current embodiments. A mobile computing device may be a laptop computer, a cellular phone, a smartphone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book.

In some embodiments, the interface 110 may be a serial advanced technology attachment (SATA) interface, a SATA express (SATAe) interface, a SAS (serial attached small computer system interface (SCSI)), a peripheral component interconnect express (PCIe) interface, a non-volatile memory express (NVMe) interface, an advanced host controller interface (AHCI), or a multimedia card (MMC) interface but is not restricted thereto. According to some embodiments, the interface 110 may transmit electrical or optical signals.

The host 200 may control a data processing operation (e.g., a write or read operation) of the data storage device 300A via the interface 110. The host 200 may refer to a host controller.

A central processing unit (CPU) 220 and a first interface 230 may communicate a command and/or data with each other via bus architecture (or a bus) 210. Although the host 200 includes the bus architecture 210, the CPU 220, the first interface 230, and a memory device 240 in the embodiments illustrated in FIG. 1, the inventive concept is not restricted to the host 200 including the components 210, 220, 230, and 240 illustrated in FIG. 1.

According to some embodiments, the host 200 may be implemented as an integrated circuit (IC), a motherboard, a system on chip (SoC), an application processor (AP), a mobile AP, a web server, a data server, or a database server, but the inventive concept is not restricted to these examples.

The bus architecture 210 may be implemented as an advanced microcontroller bus architecture (AMBA), an advanced high-performance bus (AHB), an advanced peripheral bus (APB), an advanced extensible interface (AXI), an advanced system bus (ASB), AXI coherency extensions (ACE), or a combination thereof, but the inventive concept is not restricted to these examples.

The CPU 220 may generate a write request for controlling a write operation of the data storage device 300A or a read request for controlling a read operation of the data storage device 300A. The write request may include a write address and the read request may include a read address. The CPU 220 may include one or more cores. The request may refer to a command For example, the CPU 220 may run a virtual machine (VM). In computing, a VM is emulation of a particular computer system. VMs operate based on computer architecture and functions of a real or hypothetical computer and may be implemented in hardware, software, or a combination thereof.

The first interface 230 may change the format of a command and/or data to be transmitted to the data storage device 300A and may transmit the command and/or data in a changed format to the data storage device 300A through the interface 110. The first interface 230 may be referred to as a device interface logic (or a device interface logic circuit). The first interface 230 may also change the format of a response and/or data received from the data storage device 300A and may transmit the response and/or data in a changed format to the CPU 220 through the bus architecture 210. The first interface 230 may include a transceiver which transmits and receives a command and/or data. The structure and operations of the first interface 230 may be configured to be compatible with those of the interface 110.

The memory device 240 may store data that has been processed by the CPU 220 or data to be processed by the CPU 220. The memory device 240 may be formed of volatile memory and/or non-volatile memory. The volatile memory may be random access memory (RAM), dynamic RAM (DRAM), or a static RAM (SRAM) but is not restricted thereto. For example, the memory device 240 may be a main memory device. The non-volatile memory may be NAND flash memory. Although the memory device 240 is disposed within the host 200 in the embodiments illustrated in FIG. 1, the memory device 240 may be provided outside the host 200 in other embodiments.

The data storage device 300A includes a second interface 310, a controller 320, a buffer 330, and a memory cluster 340. The memory cluster 340 may be a group of memory devices NVM.

The data storage device 300A may be a flash-based storage but is not restricted thereto. The data storage device 300A may be implemented as a solid-state drive or solid-state disk (SSD), an embedded SSD (eSSD), a universal flash storage (UFS), an MMC, an embedded MMC (eMMC), or managed NAND, but the inventive concept is not restricted to these examples. The flash-based storage may be implemented as a NAND-type flash memory device or a NOR-type flash memory device. Alternatively, the data storage device 300A may be implemented as a hard disk drive (HDD), a phase-change random access memory (PRAM) device, a magnetoresistive RAM (MRAM) device, a spin-transfer torque MRAM (STT-MRAM) device, a ferroelectric RAM (FRAM) device, or a resistive RAM (RRAM) device, but the inventive concept is not restricted to these examples.

The second interface 310 may change the format of a response and/or data to be transmitted to the host 200 and may transmit the response and/or data in a changed format to the host 200 through the interface 110. The second interface 310 may also receive a command and/or data from the host 200, change the format of the command and/or data, and transmit the command and/or data in a changed format to the buffer controller 320. The second interface 310 may include a transceiver which transmits and receives a signal and/or data. The second interface 310 may be referred to as a host interface logic (or a host interface logic circuit).

The structure and operations of the second interface 310 may be configured to be compatible with those of the interface 110. The second interface 310 may be SATA interface, SATAe interface, SAS, PCIe interface, NVMe interface, AHCI, MMC interface, NAND-type flash memory interface, or NOR-type flash memory interface but is not restricted thereto.

The controller 320 may control transmission or processing of a command and/or data transferred among the second interface 310, the buffer 330, and the memory cluster 340. The controller 320 may be implemented in an IC or SoC, but the inventive concept is not restricted to these examples. For example, the controller 320 may write firmware update data sent from the host 200 to the memory cluster 340.

The controller 320 includes a processor 321, a buffer manager 323, and a third interface 325. The processor 321, the buffer manager 323, and the third interface 325 may communicate with one another via bus architecture. The bus architecture may be implemented as AMBA, AHB, APB, AXI, ASB, ACE, or a combination thereof, but the inventive concept is not restricted to these examples.

The controller 320 also includes an internal memory 327. The internal memory 327 may store data for the operations of the controller 320 or data generated from a data processing operation (e.g. a write or read operation) performed by the controller 320. For example, the internal memory 327 may store a flash translation layer (FTL) 328 that can be executed by the processor 321. For example, when the data storage device 300 is booted, the FTL 328 may be loaded from the memory cluster 340 to the internal memory 327 and may be executed by the processor 321. According to some embodiments, the internal memory 327 may be implemented as RAM, DRAM, SRAM, buffer, buffer memory, cache, or tightly couple memory (TCM), but the type of the internal memory 327 is not restricted to these examples.

The processor 321 may control each of the components 310, 323, 325, and 327. The processor 321 may include one or more cores. The cores may share one semiconductor substrate with one another or may be formed in different semiconductor chips, respectively. Although one processor 321 is illustrated in FIG. 1, the controller 320 may include a first processor and a second processor.

The first processor may be a first CPU which may communicate data with the host 200 via the second interface 310. The second processor may be a second CPU which may communicate data with the memory cluster 340 via the third interface 325. The first CPU and the second CPU may form multi-CPU. The first CPU may control the second CPU, but the inventive concept is not restricted to the current embodiments. The processor 321 may collectively denote the processor 321, the first processor, and/or the second processor.

The buffer manager 323 may write data to or read data from the buffer 330 according to the control of the processor 321. The second interface 310 may communicate data with the buffer manager 323. The buffer manager 323 may be referred to as a buffer controller which controls write and read operations on the buffer 330.

The third interface 325 may control a data processing operation (e.g., a write operation or a read operation) of each of non-volatile memory devices NVM connected to each of channels CH0 through CHm (where "m" is a natural number of at least 2) according to the control of the processor 321 or the buffer manager 323. The third interface 325 may be a memory controller. When each non-volatile memory device NVM is a flash memory device, the third interface 325 may be a flash memory controller.

The third interface 325 may be SATA interface, SATAe interface, SAS, PCIe interface, NVMe interface, AHCI, MMC interface, NAND-type flash memory interface, or NOR-type flash memory interface but is not restricted thereto. The third interface 325 may include an error correction code (ECC) engine 326. The ECC engine 326 may correct an error in data to be stored in or output from the memory cluster 340. According to embodiments, the ECC engine 326 may be implemented in any place within the controller 320.

The buffer 330 may write data to its first data storage region or read data from its second data storage region according to the control of the buffer manager 323. The buffer 330 may be implemented as buffer memory, RAM, SRAM, or DRAM, but the inventive concept is not restricted to these examples.

The buffer 330 may include a first region which stores a mapping table for logical address-to-physical address translation with respect to memory cluster 340 and a second region which functions as a cache, but the inventive concept is not restricted to the current embodiments. For example, the FTL 328 executed by the processor 321 may perform logical address-to-physical address translation using the mapping table stored in the first region. The FTL 328 executed by the processor 321 may adjust a page offset, so that a log block including an open word line is closed.

According to some embodiments, when the controller 320 and the buffer 330 are formed in different semiconductor chips, respectively; the controller 320 and the buffer 330 may be implemented in a single package using package-on-package (PoP), multi-chip package (MCP), or system-in package (SiP), but the inventive concept is not restricted to these examples. A first chip including the buffer 330 may be stacked above a second chip including the controller 320 using stack balls, but the inventive concept is not restricted to the current embodiments. The controller 320, the buffer 330, and the memory cluster 340 may be formed in a single package (e.g., an embedded PoP (ePoP)).

The memory cluster 340 may include a plurality of clusters 341, 351, and 361. Non-volatile memory devices 343 included in the first cluster 341 may be connected to the first channel CH0, non-volatile memory devices 353 included in the second cluster 351 may be connected to the second channel CH1, and non-volatile memory devices 363 included in the m-th cluster 361 may be connected to the m-th channel CHm.

Here, the term "channel" may refer to an independent data path existing between the controller 320 or the third interface 325 and a cluster. The data path may include transmission lines that transmit data and/or control signals. The term "way" may refer to a group of at least one non-volatile memory device NVM sharing one channel For instance, each of the clusters 341, 351, and 361 may. be a way.

When a non-volatile memory device included in the memory cluster 340 is a NAND flash memory device, the NAND flash memory device may include a memory cell array and a control circuit which controls the operation of the memory cell array.

Figure 2:
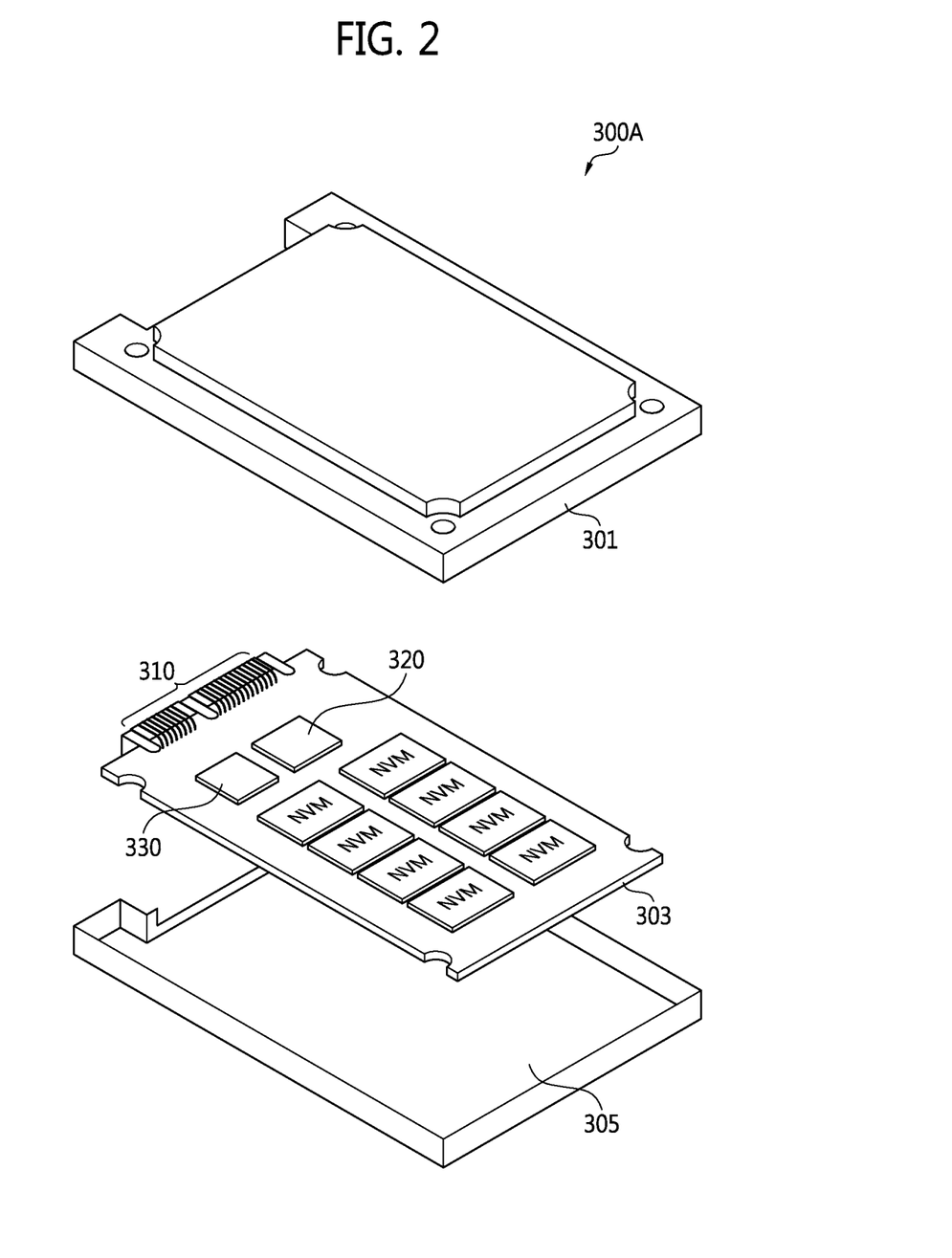
FIG. 2 is a perspective view of a data storage device illustrated in FIG. 1.

FIG. 2 is a perspective view of the data storage device 300A illustrated in FIG. 1. Referring to FIGS. 1 and 2, the data storage device 300A may be implemented as an SSD. The SSD 300A may include a top cover 301, the interface connector (i.e., the second interface) 310, the controller (e.g., SSD controller) 320, the buffer (e.g., DRAM device) 330, the non-volatile memory devices NVM, and a bottom cover 305. The controller 320 may refer to a controller chip. The buffer 330 may refer to a cache chip. The non-volatile memory devices NVM may be placed on one side or both sides of a logic board 303. The logic board 303 may be a printed circuit board (PCB).

Figure 3:
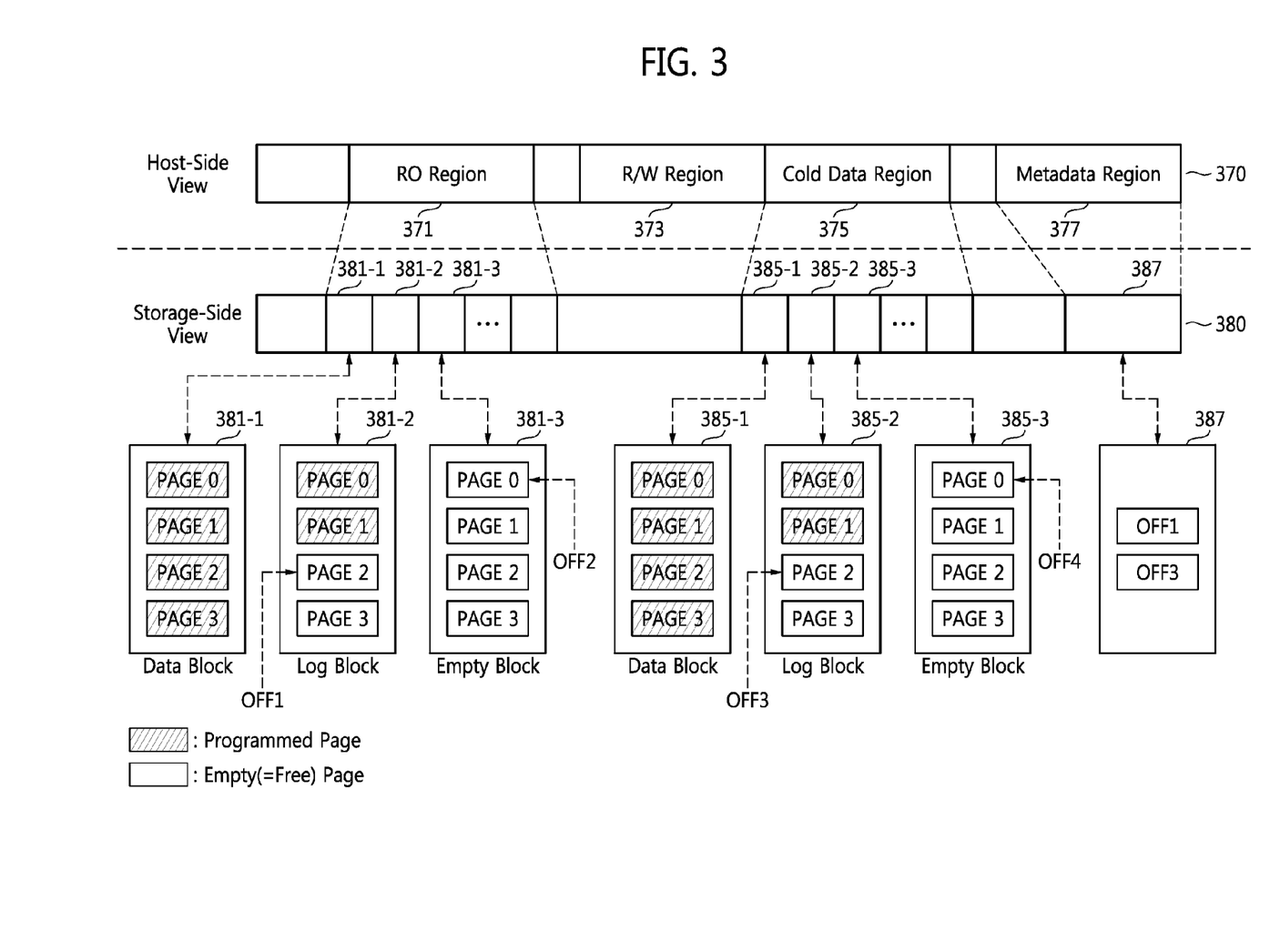
FIG. 3 is a block diagram of a memory map from the point of view of a host and a memory map from the point of view of the data storage device with respect to a memory cluster included in the data storage device illustrated in FIG. 1.

FIG. 3 is a block diagram of a memory map from the point of view of a host and a memory map from the point of view of the data storage device with respect to the memory cluster 340 included in the data storage device 300A illustrated in FIG. 1. Referring to FIGS. 1 and 3, a memory area defined by the non-volatile memory devices NVM included in the memory cluster 340 may be defined as a memory area (i.e., a host-side view memory map 370) managed by the host 200 and may be defined as a memory area (i.e., a storage-side view memory map 380) managed by the data storage device 300A. The host-side view memory map 370 may be different from the storage-side view memory map 380.

For example, the host-side view memory map 370 may include a read-only (RO) region 371, a read/write (R/W) region 373, a cold data region 375 storing cold data, and a metadata region 377 storing metadata. The R/W region 373 may store user data and the cold data region 375 may store data, such as photo data, which has a low access frequency. Each of the regions 371, 373, 375, and 377 may be referred to as a partition.

The storage-side view memory map 380 may include a plurality of blocks. For example, the RO region 371 may be matched (or mapped) to a region including a plurality of blocks 381-1, 381-2, and 381-3. The cold data region 375 may be matched (or mapped) to a region including a plurality of blocks 385-1, 385-2, and 385-3. The metadata region 377 may be matched (or mapped) to a region including at least one block 387. The maps 370 and 380 illustrated in FIG. 3 are just examples and memory maps of the memory cluster 340 are not restricted thereto. Although each of the blocks 381-1, 381-2, 381-3, 385-1, 385-2, and 385-3 includes four pages in the embodiments illustrated in FIG. 3, the inventive concept is not restricted to the number of pages included in each of the blocks 381-1, 381-2, 381-3, 385-1, 385-2, and 385-3.

It is assumed that the blocks 381-1 and 385-1 are data blocks full of data and the blocks 381-2 and 385-2 are log blocks. In the log blocks 381-2 and 385-2, pages PAGE0 and PAGE1 are full of data and pages PAGE2 and PAGE3 are empty pages (i.e., free or erased pages). The blocks 381-3 and 385-3 are assumed to be empty blocks (i.e., free blocks or blocks that can be log blocks).

The metadata block 387 may include page offsets OFF1 and OFF3. It is assumed that the first page offset OFF1 is related to the first empty page PAGE2 of the log block 381-2 and the third page offset OFF3 is related to the first empty page PAGE2 of the log block 385-2. It is also assumed that a second page offset OFF2 is related to the first empty PAGE0 of the empty block 381-3 and a fourth page offset OFF4 is related to the first empty page PAGE0 of the empty block 385-3.

The controller 320 may change the page offset OFF1 or OFF3 of the first empty page PAGE2 in the log block 381-2 or 385-2 into the page offset OFF2 or OFF4 of the first empty page PAGE0 in the empty block 381-3 or 385-3 in order to close the log block 381-2 or 385-2 including an open word line before performing a firmware update. Accordingly, new data is not written to the first empty page PAGE2 of the log block 381-2 or 385-2 which is likely to have read disturbance. As a result, uncorrectable ECC errors may be prevented from occurring in the new data.

Although the page offset OFF1 or OFF3 of the first empty page PAGE2 in the log block 381-2 or 385-2 is changed into the page offset OFF2 or OFF4 of the first empty page PAGE0 in the empty block 381-3 or 385-3 in the embodiments illustrated in FIG. 3, the changed page offset may be a page offset of any page that is not affected from read disturbance. For example, when the first empty page PAGE2 of the log block 381-2 or 385-2 is a free page and the free page offset OFF1 or OFF3 points to the first empty page PAGE2 of the log block 381-2 or 385-2, read disturbance is likely to occur in the first empty page PAGE2 of the log block 381-2 or 385-2. If read disturbance does not occur in the second empty page PAGE3 of the log block 381-2 or 385-2, a page offset may be changed from a page offset for the first empty page PAGE2 of the log block 381-2 or 385-2 into a page offset for the second empty page PAGE3 of the log block 381-2 or 385-2.

For another example, when the empty pages PAGE2 and PAGE3 of the log block 381-2 or 385-2 are free pages and the free page offset OFF1 or OFF3 points to the first empty page PAGE2 of the log block 381-2 or 385-2, read disturbance is likely to occur in the empty pages PAGE2 and PAGE3 of the log block 381-2 or 385-2. At this time, a page offset may be changed from the page offset OFF1 or OFF3 for the first empty page PAGE2 of the log block 381-2 or 385-2 into the page offset OFF2 or OFF4 for the first empty page PAGE0 of the empty block 381-3 or 385-3. In other words, a page offset which indicates a destination of next page to be programmed may be set to point a page which does not have or not affected from read disturbance.

Figure 4:
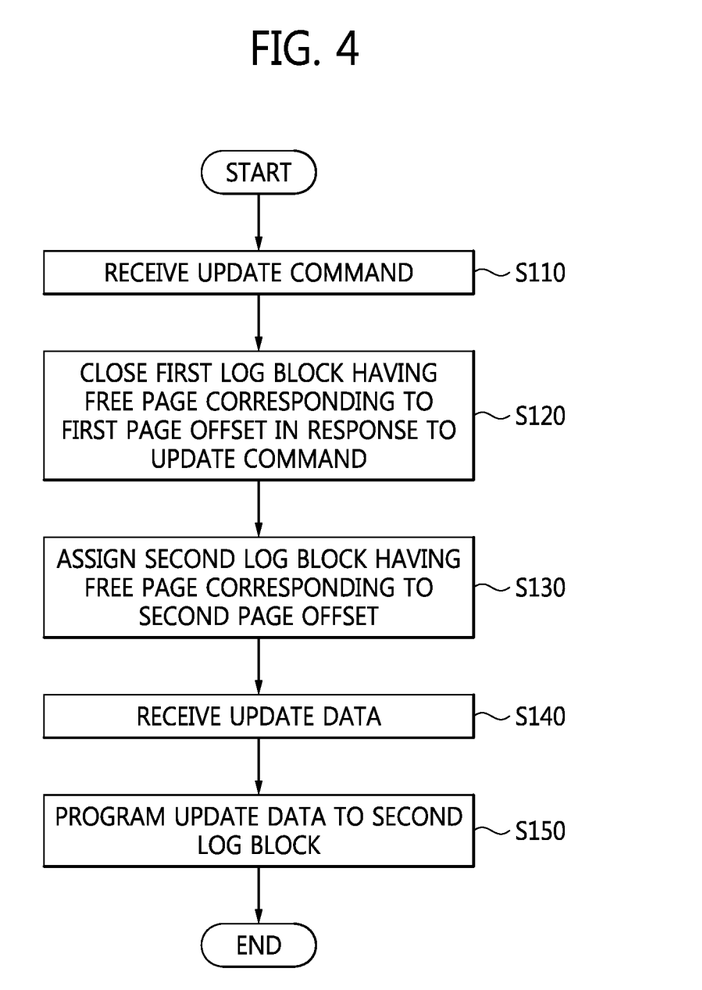
FIG. 4 is a flowchart of the operation of the data processing system illustrated in FIG. 1 according to some embodiments of the inventive concept.

FIG. 4 is a flowchart of the operation of the data processing system 100A illustrated in FIG. 1 according to some embodiments of the inventive concept. Referring to FIGS. 1 through 4, the host 200 may send the data storage device 300A information (e.g., a command or a signal) indicating that a system update will be executed before performing firmware over the air (FOTA) or the system update on the data processing system 100A. The data storage device 300A may close the log block 381-2 or 385-2 including an open word line based on the information, thereby preventing new data for the system update from being subsequently written to the first empty page PAGE2 in the log block 381-2 or 385-2.

In detail, the controller 325 of the data storage device 300A may receive an update command for a system update in operation S110. The controller 325 may search the first page offsets OFF1 and OFF3 stored in the metadata block 387 corresponding to the metadata region 377 in response to the update command The controller 325 may determine that the block 381-2 or 385-2 is a log block based on the search result. The controller 325 may close the first log block 381-2 or 385-2 including the empty page (or free page) PAGE2 corresponding to the first page offset OFF1 or OFF3 based on determining of closing operation S120. The controller 325 may assign the second log block 381-3 or 385-3 having the empty page (or free page) PAGE0 corresponding to the second page offset OFF2 or OFF4 in operation S130.

The controller 325 may receive update data from the host 200 in operation S140 and may write (or program) the update data to the second log block 381-3 or 385-3 instead of the first log block 381-2 or 385-2 in operation S150. As a result, occurrence of uncorrectable ECC errors may be prevented in the update data which is highly likely to have or have had read disturbance.

Figure 5:
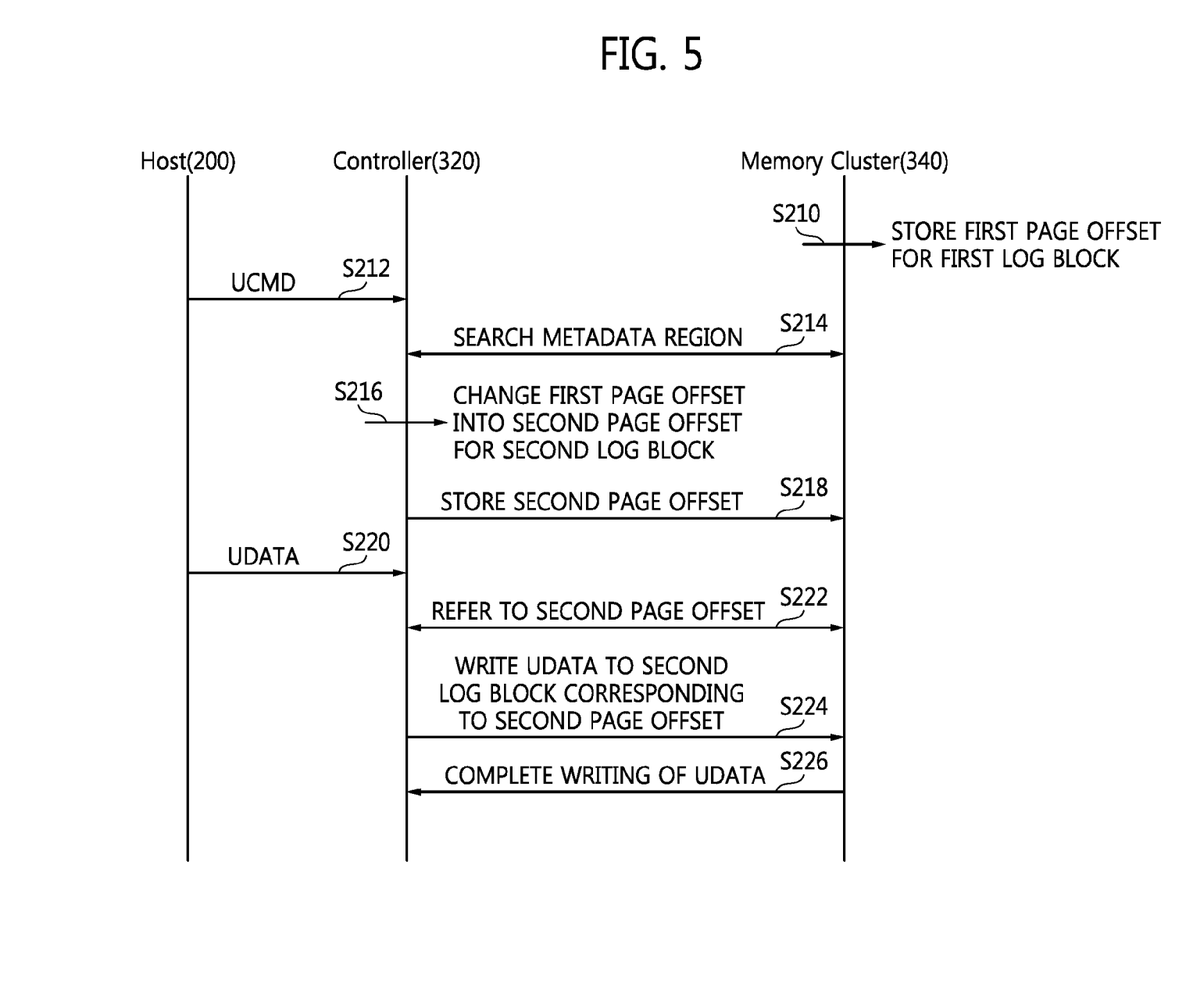
FIG. 5 is a detailed flowchart of the operation of the data processing system illustrated in FIG. 1 according to some embodiments of the inventive concept.
Figure 6:
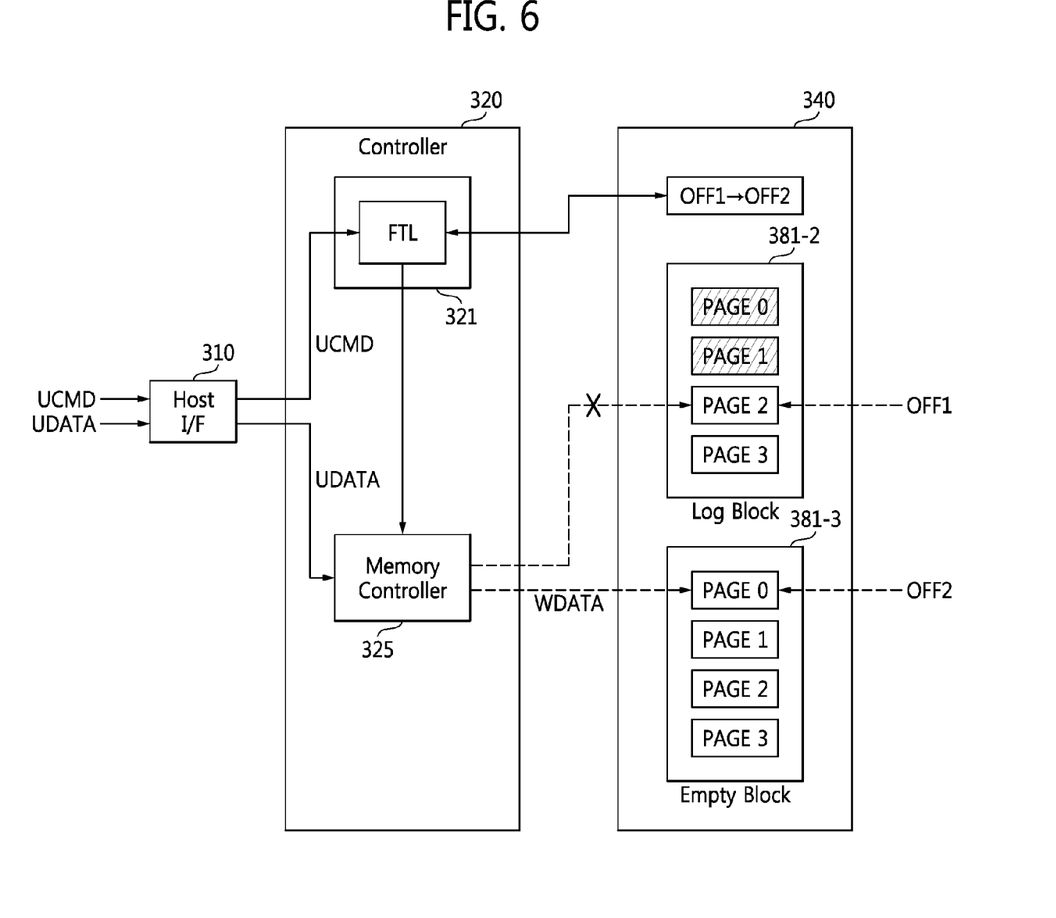
FIG. 6 is a conceptual diagram for explaining a log block closing operation performed by the data storage device illustrated in FIG. 1.

FIG. 5 is a detailed flowchart of the operation of the data processing system 100A illustrated in FIG. 1 according to an embodiment of the inventive concept. FIG. 6 is a conceptual diagram for explaining a log block closing operation performed by the data storage device 300A illustrated in FIG. 1. Referring to FIGS. 1 through 6, when a write operation on the page PAGE1 of the first log block 381-2 or 385-2 is completed, the controller 320 may store the first page offset OFF1 or OFF3 in the metadata block 387 of the memory cluster 340 in operation S210.

The host 200 may send an update command UCMD for a system update to the data storage device 300A in operation S212. The update command UCMD may be transmitted to the processor 321 via the second interface 310. The processor 321 or an FTL executed by the processor 321 may search the metadata block 387 in operation S214.

The processor 321 or the FTL executed by the processor 321 may change the first page offset OFF1 or OFF3 into the second page offset OFF2 or OFF4 for the second log block (e.g., the empty block) 381-3 or 385-3 in operation S216. The processor 321 or the FTL executed by the processor 321 may store the second page offset OFF2 or OFF4 in the metadata block 387 in operation S218.

The host 200 may send update data UDATA related to the system update to the data storage device 300A in operation S220. The update data UDATA may be transmitted to the memory controller 325 via the second interface 310. The processor 321 or the FTL may refer to the second page offset 01-1-2 or OFF4 stored in the metadata block 387 in operation S222.

The memory controller 325 may write the update data UDATA to the second log block (i.e., the empty block) 381-3 or 385-3 corresponding to the second page offset OFF2 or OFF4 in operation S224. Under the control of the processor 321 or the FTL. When the update data UDATA is completely written to the second log block (i.e., the empty block) 381-3 or 385-3, the memory controller 325 may send a signal related to the write completion to the host 200 in operation S226.

Figure 7:
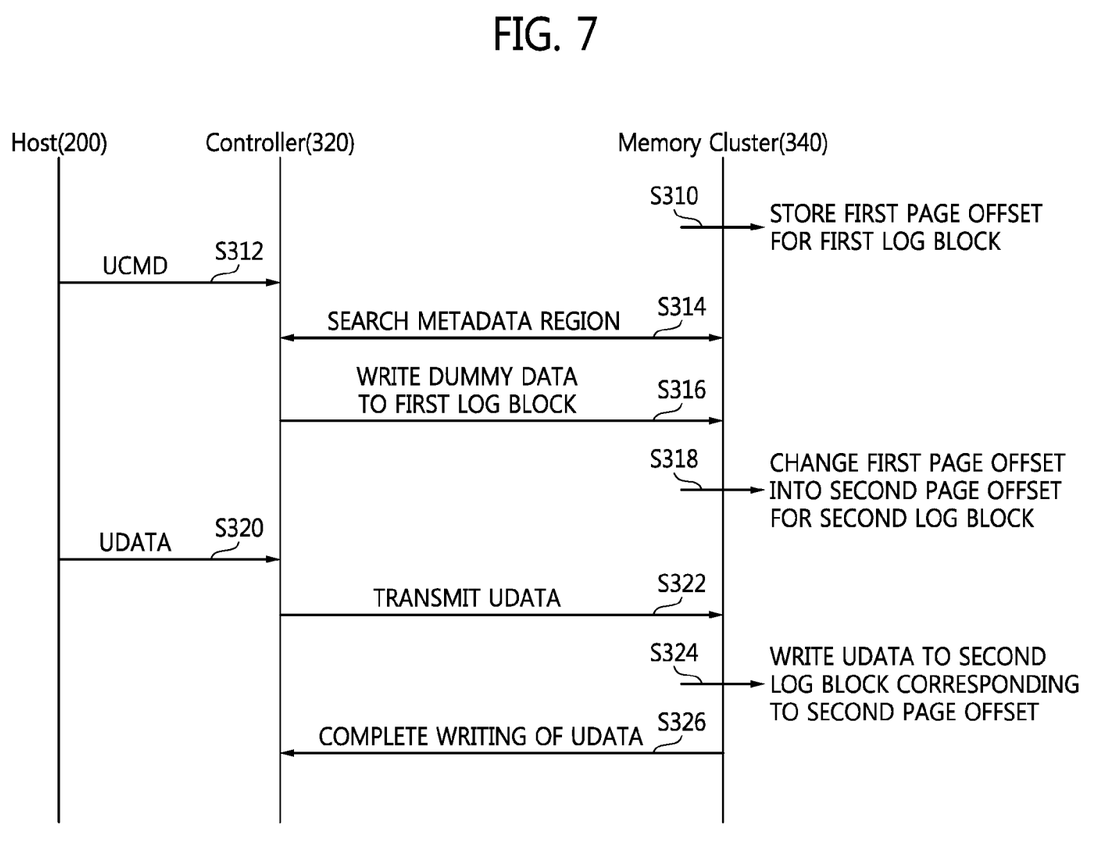
FIG. 7 is a detailed flowchart of the operation of the data processing system illustrated in FIG. 1 according to some embodiments of the inventive concept.

FIG. 7 is a detailed flowchart of the operation of the data processing system 100A illustrated in FIG. 1 according to other embodiments of the inventive concept. Referring to FIGS. 1 through 4 and FIG. 7, when a write operation on the page PAGE1 of the first log block 381-2 or 385-2 is completed, the controller 320 may store the first page offset OFF1 or OFF3 in the metadata block 387 of the memory cluster 340 in operation S310.

The host 200 may send the update command UCMD for a system update to the data storage device 300A in operation S312. The update command UCMD may be transmitted to the processor 321 via the second interface 310. The processor 321 or the FTL may search the metadata block 387 in operation S314.

The processor 321 or the FTL may determine the log block 381-2 or 385-2 as the first log block according to the search result. The memory controller 325 may write dummy data to the empty pages PAGE2 and PAGE3 of the first log block 381-2 or 385-2 according to the control of the processor 321 or the FTL in operation S316. As the writing of the dummy data to the empty pages PAGE2 and PAGE3 is completed, the first log block 381-2 or 385-2 may become a data block and the first page offset OFF1 or OFF3 may be changed. In other words, until the first page offset OFF1 or OFF3 becomes the second page offset OFF2 or OFF4, the memory controller 325 may write dummy data to the empty pages PAGE2 and PAGE3 of the first log block 381-2 or 385-2 according to the control of the processor 321 or the FTL in operation S316. The processor 321 or the FTL may change the first page offset OFF1 or OFF3 stored in the metadata block 387 into the second page offset OFF2 or OFF4 in operation S318.

The host 200 may send the update data UDATA related to the system update to the data storage device 300A in operation S320. The update data UDATA may be transmitted to the memory controller 325 via the second interface 310. The processor 321 or the FTL may refer to the second page offset 01-1-2 or OFF4 stored in the metadata block 387.

The memory controller 325 may transmit the update data UDATA to the memory cluster 340 according to the control of the processor 321 or the FTL in operation S322. The memory cluster 340 may write the update data UDATA to the second log block 381-3 or 385-3 corresponding to the second page offset OFF2 or OFF4 according to the control of the memory controller 325 in operation S324. When the update data UDATA is completely written to the second log block (i.e., the empty block) 381-3 or 385-3, the memory controller 325 may send a signal related to the write completion to the host 200 in operation S326.

A procedure for programming the update data UDATA to the first empty page PAGE0 of the second log block (i.e., empty block) 381-3 or 385-3 instead of the first empty page PAGE2 of the first log block 381-2 or 385-2 has been described with reference to FIGS. 1 through 7. However, the inventive concept may also be applied to a method of closing a log block (e.g., 385-2) including an open word line while storing cold data.

Figure 8:
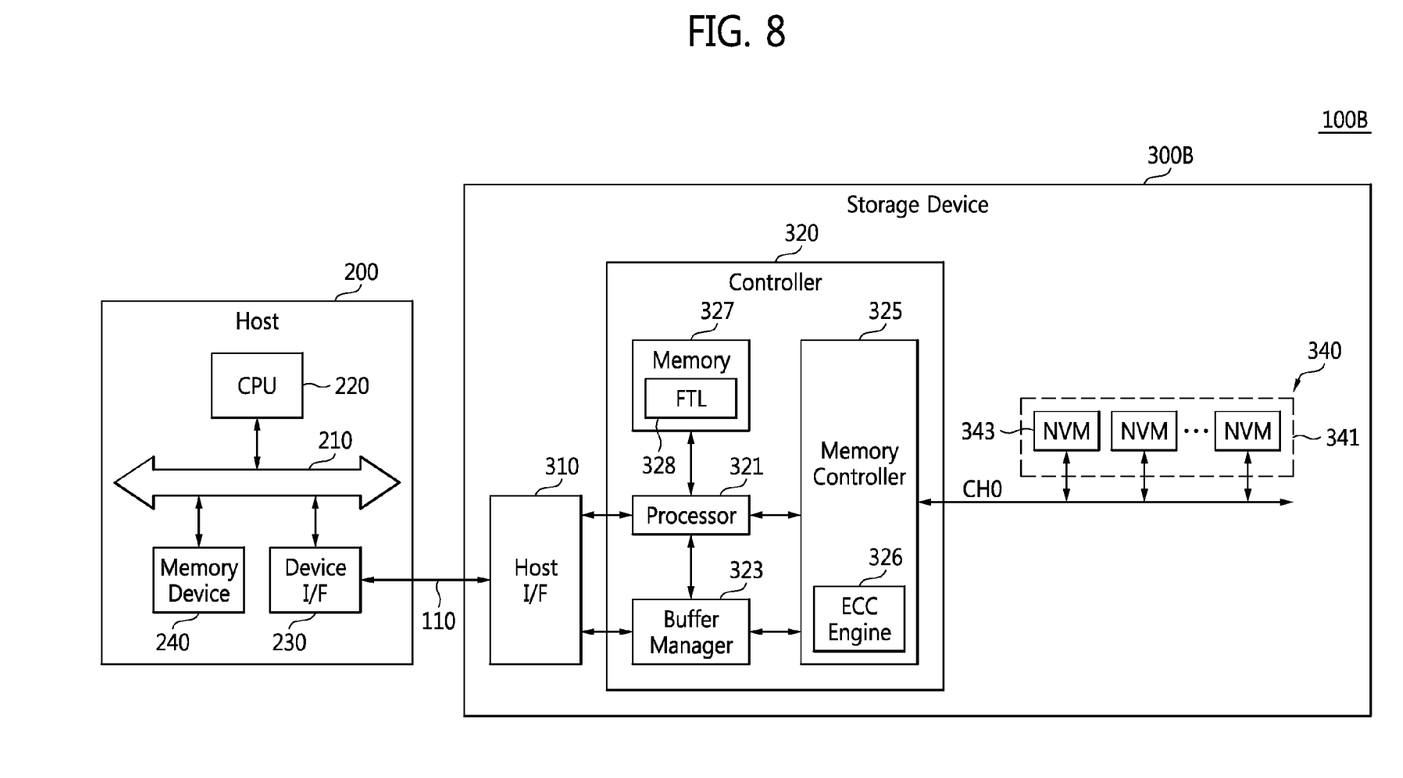
FIG. 8 is a block diagram of a data processing system according to some embodiments of the inventive concept.

FIG. 8 is a block diagram of a data processing system 100B according to some embodiments of the inventive concept. Referring to FIG. 8, the data processing system 100B includes the host 200 and a DRAM-less data storage device 300B. The data processing system 100B may be implemented as a tablet PC or an eMMC. The DRAM-less data storage device 300B includes the second interface 310, the controller 320, and the memory cluster 340.

The buffer manager 323 does not perform data processing for an external buffer. During a write or read operation, the buffer manager 323 may transmit data to the second interface 310 or the third interface 325 using its internal buffer. Apart from the operation of the buffer manager 323, the structure and operations of the controller 320 illustrated in FIG. 8 are substantially the same as or similar to those of the controller 320 illustrated in FIG. 1, and therefore, the detailed descriptions of the controller 320 will be omitted.

Figure 9:
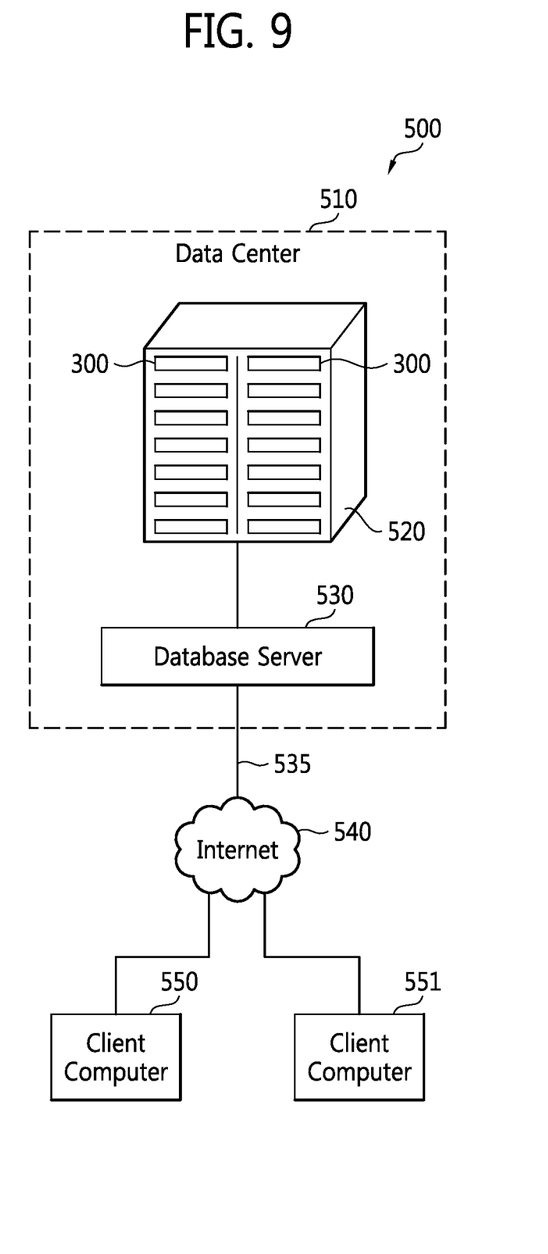
FIG. 9 is a block diagram of a data processing system according to some embodiments of the inventive concept.

FIG. 9 is a block diagram of a data processing system 500 according to some embodiments of the inventive concept. Referring to FIGS. 1 through 9, the data processing system 500 includes a database 520, a database server 530, a second network 540, and a plurality of client computers 550 and 551. The database 520 and the database server 530 may be included in a data center 510. The data center 510 may be an internet data center or a cloud data center.

The database 520 may include a plurality of data storage devices 300A or 300B (collectively denoted by "300"). The data storage devices 300 may be installed in racks. The structure and operations of the data storage devices 300 are substantially the same as or similar to those of the data storage device 300 described above with reference to FIGS. 1 through 8.

The database server 530 may control the operations of each of the data storage devices 300. The database server 530 may function as the host 200 illustrated in FIG. 1. The database server 530 may be connected to the second network 540, e.g. an internet or Wi-Fi, via a first network 535, e.g. a local area network (LAN). The client computers 550 and 551 may be connected to the database server 530 via the second network 540.

The data storage device 300 may be implemented as DAS, a data storage device used in a SAN, or a NAS, but the inventive concept is not restricted to these examples. The data processing system 500 may be implemented as a redundant array of inexpensive disks (RAID) system.

As described above, according to some embodiments of the inventive concept, a data storage device closes a log block including an open word line based on information sent from a host, thereby avoiding an uncorrectable ECC error that may occur when new data is subsequently written to the log block having read disturbance. Without uncorrectable ECC error, the data storage device is able to reliably and correctly store data sent from the host. Consequently, the data storage device prevents data transmitted from the host from being corrupt.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

While the inventive concept has been particularly shown and described with reference to embodiments thereof, it will be understood by those of ordinary skill in the art that various changes in forms and details may be made therein without departing from the spirit and scope of the inventive concept as defined by the following claims.

What is claimed is:

1. A method of operating a data storage device including a non-volatile memory device, the method comprising:
receiving an update command from a host;
substituting, for a first page offset pointing to a first empty page within a log block of the non-volatile memory device, a second page offset pointing to a second empty page within the log block;
writing update data related to the update command within the second empty page; and
closing the log block, which comprises an open word line, in response to the update command.

2. The method of claim 1, further comprising receiving the update data from the host.

3. The method of claim 2, wherein the log block is included in a read-only region from a viewpoint of the host.

4. The method of claim 2, wherein the log block is included in a cold data region that stores cold data.

5. The method of claim 1, wherein closing the log block prevents data from being written to the first empty page.

6. The method of claim 1, wherein closing the log block comprises writing dummy data to all empty pages included in the log block to change the log block into a data block.

7. The method of claim 1, wherein the non-volatile memory device is distinguished from other non-volatile memory devices by a channel and a way.

8. A method of operating a system including a host and a data storage device having a non-volatile memory device, the method comprising:
transmitting, by the host, an update command to the data storage device;
substituting, for a first page offset pointing to a first empty page within a log block of the non-volatile memory device, a second page offset pointing to a second empty page within the log block;
writing update data related to the update command within the second empty page using the second page offset; and
closing, by the data storage device and in response to the update command, the log block, which includes an open word line.

9. The method of claim 8, further comprising receiving, by the data storage device, the update data.

10. The method of claim 9, wherein the log block is included in a read-only region from a viewpoint of the host or included in a cold data region that stores cold data.

11. The method of claim 8, wherein closing the log block prevents data from being written to an empty page of the log block.

12. The method of claim 8, wherein closing the log block comprises writing dummy data to all empty pages within the log block to change the log block into a data block.

13. The method of claim 8, wherein closing the log block reduces an amount of read disturbance generated in the log block.

14. A method of operating a data storage device that includes a non-volatile memory device having a log block with an open word line, the method comprising:
receiving an update command from a host;
substituting, for a first page offset pointing to a first empty page within a log block of the non-volatile memory device, a second page offset pointing to a second empty page within the log block; and
writing update data related to the update command within the second empty page.

15. The method of claim 14, wherein substituting the second page offset for the first page offset prevents the update data from being written to the first empty page.

* * * * *